United States Patent [19]

Shimizu et al.

[11] Patent Number: 5,310,800
[45] Date of Patent: May 10, 1994

[54] THERMOPLASTIC ELASTOMER

[75] Inventors: Shizuo Shimizu, Tokyo; Akira Uchiyama; Kunihide Hiraoka, both of Ichihara; Katsuo Okamoto, Funabashi; Yasuhiko Otawa, Ichihara, all of Japan

[73] Assignee: Mitsui Petrochemical Industries, Ltd., Tokyo, Japan

[21] Appl. No.: 860,192

[22] Filed: Mar. 26, 1992

Related U.S. Application Data

[63] Continuation of Ser. No. 408,430, Sep. 15, 1989, abandoned, which is a continuation of Ser. No. 114,027, Oct. 29, 1987, abandoned.

[30] Foreign Application Priority Data

| Oct. 29, 1986 | [JP] | Japan | 61-255912 |
| Oct. 29, 1986 | [JP] | Japan | 61-255913 |
| Oct. 29, 1986 | [JP] | Japan | 61-255914 |
| Dec. 22, 1986 | [JP] | Japan | 61-303818 |

[51] Int. Cl.$^5$ ............................................. C08L 23/26
[52] U.S. Cl. .................................. 525/193; 525/74; 525/194; 525/197; 525/240; 525/232; 524/528; 524/413
[58] Field of Search ............... 525/78, 301, 205, 193, 525/194

[56] References Cited

U.S. PATENT DOCUMENTS

| 3,806,558 | 4/1974 | Fischer ................. 525/198 |
| 4,174,335 | 11/1979 | Ohdaira et al. ........... 525/78 |
| 4,284,541 | 8/1981 | Takeda et al. ........... 525/78 |
| 4,382,128 | 5/1983 | Li ....................... 525/285 |
| 4,562,230 | 12/1985 | Fukui et al. ............ 525/78 |
| 4,619,972 | 10/1986 | Inoue et al. ............ 525/193 |

FOREIGN PATENT DOCUMENTS

| 0014018 | 8/1980 | European Pat. Off. . |
| 0027375 | 4/1981 | European Pat. Off. . |
| 0164217 | 12/1985 | European Pat. Off. . |
| 0171025 | 2/1986 | European Pat. Off. . |
| 2328013 | 10/1976 | France . |
| 131031 | 10/1980 | Japan ................... 525/78 |
| 7900503 | 7/1980 | Netherlands ........... 525/78 |
| 2081723 | 2/1982 | United Kingdom ..... 525/78 |

Primary Examiner—Carman J. Seccuro, Jr.
Attorney, Agent, or Firm—Sherman and Shalloway

[57] ABSTRACT

A partially crosslinked thermoplastic elastomer composition having an excellent heat-bondability is obtained by dynamically heat-treating a peroxide-crosslinking olefin copolymer rubber with an α,β-unsaturated carboxylic acid or a derivative thereof in the presence of an organic peroxide.

22 Claims, No Drawings

THERMOPLASTIC ELASTOMER

This application is a continuation of application Ser. No. 07/408,430, filed Sep. 15, 1989, now abandoned, which is a continuation of application Ser. No. 07/114,027, filed Oct. 29, 1987, now abandoned.

BACKGROUND OF THE INVENTION

1. Field of the Invention

The present invention relates to a thermoplastic elastomer composition having an excellent heat-bondability to various resins and metals and having a high rubbery elasticity, a good moldability and a high heat resistance. More particularly, the present invention relates to a partially crosslinked thermoplastic elastomer, which is formed by dynamically heat-treating a peroxide-crosslinking olefin copolymer rubber with an unsaturated carboxylic acid or a derivative thereof in the presence of an organic peroxide.

2. Description of the Prior Art

A thermoplastic elastomer has been known as an energy-saving and resource-saving substitute for a cured rubber.

As the thermoplastic elastomer of this type, there is known, for example, an olefinic thermoplastic elastomer comprising as the main component an ethylene/propylene/non-conjugated diene copolymer rubber. This thermoplastic elastomer is excellent in thermoplastic elastomer performances, but since the bondability to various resins or metals is insufficient, the application range of this thermoplastic elastomer is considerably limited.

Graft modification of the above-mentioned rubber component with maleic anhydride or the like has been tried for improving the bondability. In this case, the bondability is improved, but such a disadvantage as reduction of the rubbery elasticity, the moldability and the like cannot be avoided.

Namely, a thermoplastic elastomer which is excellent in such properties as rubbery elasticity and moldability and has an excellent bondability to various resins and metals has not been known.

SUMMARY OF THE INVENTION

We made research with a view to developing a thermoplastic elastomer being excellent in not only such properties as rubbery elasticity and moldability but also bondability to various resins and metals. As the result, we have now completed the present invention.

More specifically, in accordance with one aspect of the present invention, there is provided a thermoplastic elastomer composition comprising a blend comprising (a) 10 to 100 parts by weight of a peroxide-crosslinking olefin copolymer rubber, (b) 0 to 90 parts by weight of an olefinic plastic, the sum of the amounts of the components (a) and (b) being 100 parts by weight, and (c) 0.01 to 10 parts by weight of an unsaturated carboxylic acid or a derivative thereof, said thermoplastic elastomer composition being partially crosslinked by dynamically heat-treating said blend in the presence of an organic peroxide.

In accordance with another aspect of the present invention, there is provided a thermoplastic elastomer composition as set forth above, wherein said blend further comprises at least one additive selected from the group consisting of (d) 0 to 100 parts by weight of a peroxide-non-crosslinking rubbery substance, (e) 0 to 200 parts by weight of a mineral oil type softener and (f) 0 to 100 parts by weight of a fibrous filler, per 100 parts by weight of the sum of the amounts of the components (a) and (b).

In accordance with still another aspect of the present invention, there is provided a thermoplastic elastomer composition as set forth above, wherein the fibrous filler (f) is incorporated after partial crosslinking.

Furthermore, the present invention includes an embodiment in which a polyolefin plastic is blended in the above-mentioned thermoplastic elastomer composition.

Namely, the most characteristic feature of the present invention resides in that a peroxide-crosslinking olefin copolymer is dynamically heat-treated with an unsaturated carboxylic acid or a derivative thereof in the presence of an organic peroxide to obtain a partially crosslinked thermoplastic elastomer composition.

The thermoplastic elastomer composition of the present invention is excellent in not only such properties as rubbery elasticity and moldability but also bondability to various resins and metals, and if additive substances as described above are incorporated before or after the dynamic heat treatment, these characteristics are further improved.

DETAILED DESCRIPTION OF THE PREFERRED EMBODIMENTS

In the thermoplastic elastomer of the present invention, the peroxide-crosslinking olefin copolymer rubber (a) is a component imparting a rubbery elasticity, and since the component (a) is partially crosslinked, it ensures a high heat resistance.

The olefinic plastic (b) is a component imparting a flowability at an elevated temperature, and by dint of the presence of this component, a predetermined moldability is retained in the thermoplastic elastomer composition.

The unsaturated carboxylic acid or derivative thereof such as maleic anhydride as the component (c) is a modifier which imparts a good bondability to various resins and metals to the thermoplastic elastomer composition.

According to the present invention, by the actions of the respective components, the rubbery elasticity, heat resistance and moldability can be maintained at predetermined levels and the bondability to various resins and metals can be highly improved.

In the preferred embodiment of the present invention, the peroxide-non-crosslinking rubbery substance (d) and the mineral oil softener (e) act as the flowability improver for the rubber component, and the moldability and processability of the composition of the present invention can be improved. Furthermore, the fibrous filler (f) imparts a good dimension stability (low linear expansion coefficient) and a good shape stability (appropriate rigidity) to the composition, and the olefinic plastic to be incorporated into the thermoplastic elastomer after partial crosslinking acts especially as the agent for improving the heat resistance and flowability.

In this preferred embodiment, since the olefinic plastic is incorporated after the dynamic heat treatment of the rubber component, the plastic hardly undergoes degradation or crosslinking by the organic peroxide, and as compared with the case where the plastic is incorporated before the dynamic heat treatment, the characteristics of the polyolefin such as high heat resistance and high flowability are strongly reflected in the thermoplastic elastomer composition.

The respective components of the thermoplastic elastomer composition of the present invention will now be described.

(A) PEROXIDE-CROSSLINKING OLEFIN COPOLYMER RUBBER

The peroxide-crosslinking olefin copolymer rubber used in the present invention is an amorphous elastic copolymer comprising an olefin as the main component, such as an ethylene/propylene copolymer rubber, an ethylene/propylene/non-conjugated diene rubber and an ethylene/butadiene copolymer rubber, and a rubber having such a property that if the rubber is mixed with an organic peroxide and kneaded under heating, the flowability is reduced or lost at all is meant. As the non-conjugated diene, there can be mentioned dicyclopentadiene, 1,4-hexadiene, dicyclooctadiene, methylene-norbornene and 5-ethylidene-2-norbornene.

Of these copolymer rubbers, an ethylene/propylene copolymer rubber and an ethylene/propylene/non-conjugated diene rubber are preferably used, and a copolymer rubber in which the molar ratio between ethylene units and propylene units (ethylene/propylene molar ratio) is from 50/50 to 90/10, especially from 55/45 to 85/15, is preferred. An ethylene/propylene/non-conjugated diene copolymer rubber, particularly an ethylene/propylene/5-ethylidene-2-norbornene copolymer rubber or an ethylene/propylene/5-ethylidene-2-norbornene/dicyclopentadiene quadripolymer, is especially preferred because a thermoplastic elastomer excellent in heat resistance, tensile characteristics and repulsion elasticity can be obtained.

In order to obtain a composition excellent in the tensile characteristics and flowability, it is preferred that the Mooney viscosity $ML_{1+4}$ (100° C.) of the copolymer rubber be 10 to 120, especially 40 to 80.

It also is preferred that the iodine value (unsaturation degree) of the copolymer rubber be smaller than 16. If this requirement is satisfied, a thermoplastic elastomer which is well-balanced between the flowability and the rubbery properties can be obtained.

(B) OLEFINIC PLASTIC

The olefinic plastic as the component (b) is a crystalline high-molecular-weight solid product obtained by polymerizing at least one mono-olefin according to the high-pressure method or low-pressure method.

For example, there can be mentioned isotactic and syndiotactic mono-olefin homopolymer and copolymer resins, and typical mono-olefin polymer resins are commercially available.

As preferred examples of the mono-olefin, there can be mentioned ethylene, 1-butene, 1-pentene, 1-hexene, 2-methyl-1-propene, 3-methyl-1-pentene, 4-methyl-1-pentene and 5-methyl-1-hexene.

In the present invention, a peroxide-decomposing olefinic plastic and polyethylene are especially preferred as the olefinic plastic.

By the peroxide-decomposing olefinic plastic is meant an olefinic plastic having such a property that if the olefinic plastic is mixed with a peroxide and kneaded under heating, the molecular weight is decreased by thermal decomposition and the flowability of the resin is increased. For example, there can be mentioned isotactic polypropylene and copolymers of propylene with a minor amount of other $\alpha$-olefin, such as a propylene/ethylene copolymer, a propylene/1-hexene copolymer and a propylene/4-methyl-1-pentene copolymer. It is preferred that the melt index (ASTM D-1238-65T, 230° C.) of the incorporated olefinic plastic be 0.1 to 50, especially 5 to 20. In the present invention, the olefinic plastic exerts the effects of improving the flowability and heat resistance of the composition.

(C) UNSATURATED CARBOXYLIC ACID OR DERIVATIVE THEREOF

In the present invention, as the unsaturated carboxylic acid or derivative thereof as the component (c), there can be used $\alpha,\beta$-unsaturated carboxylic acids such as acrylic acid, methacrylic acid, maleic acid, fumaric acid, itaconic acid, citraconic acid and tetrahydrophthalic acid, unsaturated carboxylic acids such as bicyclo (2,2,1) hept-2-ene-5,6-dicarboxylic acid, $\alpha,\beta$-unsaturated carboxylic anhydrides such as maleic anhydride, itaconic anhydride, citraconic anhydride and tetrahydrophthalic anhydride, unsaturated carboxylic anhydrides such as bicyclo (2,2,1)hept-2-ene-5,6-dicarboxylic anhydride, and unsaturated carboxylic acid esters such as methyl acrylate, methyl methacrylate, dimethyl maleate, monomethyl maleate, diethyl fumarate, dimethyl itaconate, diethyl citraconate, dimethyl tetrahydrophthalate and dimethyl bicyclo(2,2,1)hept-2-ene-5,6-dicarboxylate. Of these compounds, maleic acid, bicyclo (2,2,1)hept-2-ene-5,6-dicarboxylic acid and anhydrides thereof are preferred.

The component (c) acts as a grafting modifier and improves the bondability.

OTHER ADDITIVES

The present invention includes an embodiment in which at least one additive selected from the group consisting of (d) a peroxide-non-crosslinking rubbery substance, (e) a mineral oil type softener and (f) a fibrous filler is used in addition to the above-mentioned components (a) through (c).

A hydrocarbon type rubbery substance (d) having such a property that even if the rubbery substance is mixed with a peroxide and kneaded under heating, the rubbery substance is not crosslinked and the flowability is not reduced is used as the peroxide-non-crosslinking rubbery substance. For example, there can be mentioned polyisobutylene, butyl rubber (IIR), a propylene/ethylene copolymer rubber having a propylene content of at least 70 mole % and atactic polypropylene. In view of the performance and the handling easiness, polyisobutylene and butyl rubber (IIR) are especially preferred as the component (d).

The component (d) exerts a function of improving the flowability and the permanent set of the elastomer composition. It is preferred that the Mooney viscosity of the component (d) be lower than 60.

The mineral oil type softener as the component (e) is a high-boiling-point petroleum fraction ordinarily used for weakening the intermolecular force of a rubber in roll processing of the rubber to facilitate the processing, assisting the dispersion of carbon black or white carbon incorporated as the filler, or reducing the hardness of a cured rubber to increase the softness and elasticity, and this fraction includes a paraffin type, a naphthene type and an aromatic type.

The fibrous filler (f) preferably has a diameter of 0.1 to 15 $\mu$m and a length of 5 to 10 $\mu$m. As specific examples, there can be mentioned glass fiber (chopped strand, roving, milled glass fiber and glass flake), wollastonite, cut fiber, rock fiber, micro fiber, processed mineral fiber, carbon fiber, gypsum fiber, aromatic polyamide fiber and potassium titanate fiber. Of these fillers, milled glass fiber, glass flake and potassium titanate fiber are preferred. In order to further improve the wettability with the thermoplastic elastomer, it is preferred that the fibrous filler be treated with a silane type, chromium type of titanium type coupling agent. The fibrous filler can also be incorporated before the partial crosslinking but the fibrous filler can also be incorporated at the grafting step or the subsequent step.

In the present invention, a polyolefin plastic can be incorporated into the thermoplastic elastomer composition after the partial crosslinking. It is preferred that the polyolefin plastic be incorporated in such an amount that the polyolefin plastic/thermoplastic elastomer composition weight ratio is from 0/100 to 75/25. Namely, it is preferred that the polyolefin plastic be incorporated in an amount of up to 300 parts by weight, especially up to 200 parts by weight, per 100 parts by weight of the thermoplastic elastomer composition.

As the polyolefin plastic to be incorporated into the thermoplastic elastomer composition, there can be mentioned, for example, known high-density, medium-density and low-density polyethylenes, isotactic polypropylene and copolymers of propylene with other $\alpha$-olefin, such as a propylene/ethylene copolymer, a propylene/1-butene copolymer, a propylene/1-hexene copolymer and a propylene/4-methyl-1-pentene copolymer. It is preferred that the melt index (ASTM D-1238-65T, 230° C.) of the incorporated olefinic plastic be 0.1 to 50, preferably 5 to 20. In the present invention, the olefinic plastic exerts the effects of improving the flowability and heat resistance of the composition.

PREPARATION OF ELASTOMER COMPOSITION

According to one preferred embodiment of the present invention, the thermoplastic elastomer composition is prepared by blending (a) 10 to 100 parts by weight, preferably 10 to 95 parts by weight, especially preferably 40 to 95 parts by weight, of the peroxide-crosslinking olefin copolymer rubber, (b) 0 to 90 parts by weight, preferably 5 to 90 parts by weight, especially preferably 5 to 60 parts by weight, of the olefinic plastic (the sum of the amounts of the components (a) and (b) is 100 parts by weight) and (c) 0.01 to 10 parts by weight, especially 0.1 to 5 parts by weight of the $\alpha,\beta$-unsaturated carboxylic acid or derivative thereof and dynamically heat-treating the blend in the presence of an organic peroxide to effect partial crosslinking.

According to another preferred embodiment of the present invention, the thermoplastic elastomer composition is prepared by blending the above-mentioned components (a), (b) and (c) and at least one additive selected from the group consisting of (d) 0 to 100 parts by weight, preferably 5 to 100 parts by weight, especially preferably 5 to 50 parts by weight, of the peroxide-non-crosslinking rubbery substance, (e) 0 to 200 parts by weight, preferably 3 to 100 parts by weight, especially preferably 3 to 80 parts by weight, of the mineral oil type softener and (f) 0 to 100 parts by weight, preferably 0.1 to 100 parts by weight, especially preferably 4 to 35 parts by weight, of the fibrous filler and dynamically heat-treating the blend in the presence of an organic peroxide to effect partial crosslinking.

If the copolymer rubber component (a) is used in an amount within the above-mentioned range, a composition excellent in rubbery characteristics such as rubbery elasticity and moldability can be obtained.

If the olefinic plastic (b) is incorporated in an amount within the above-mentioned range, a composition excellent in rubbery characteristics such as rubbery elasticity, and flowability and moldability can be obtained.

The moldability and heat bondability can be improved if the unsaturated carboxylic acid or derivative thereof (c) is used in an amount within the above-mentioned range.

If the components (d) and (e) are used in amounts within the above-mentioned ranges, the rubbery characteristics and moldability can be improved.

If the fibrous filler (f) is used in an amount within the above-mentioned range, the flowability, dimension stability and size stability can be improved.

A filler or colorant can be incorporated in the elastomer composition, so far as the flowability (moldability), rubbery characteristics and heat bondability of the final composition are not degraded. As the filler, there can be mentioned calcium carbonate, clay kaolin, talc, silica, diatomaceous earth, mica powder, asbestos, alumina, barium sulfate, aluminum sulfate, calcium sulfate, basic magnesium carbonate, molybdenum disulfide, graphite, glass fiber, glass bead, shirasu balloon and carbon fiber, and as the colorant, there can be mentioned carbon black, titanium oxide, zinc flower, red iron oxide, ultramarine, prussian blue, an azo pigment, a nitroso pigment, a lake pigment and a phthalocyanine pigment.

Furthermore, in the present invention, known heat stabilizers such as phenol type, sulfite type, phenylalkane, phosphite type and amine type stabilizers, aging-preventing agents, weathering agents, antistatic agents, and lubricants such as metal soaps and waxes can be incorporated in amounts customarily used for olefinic plastics or olefin copolymer rubbers.

In the present invention, the blend comprising the above-mentioned components is dynamically heat-treated in the presence of an organic peroxide to effect partial crosslinking. By the dynamic heat treatment is meant kneading in the molten state.

As the organic peroxide used in the present invention, there can be mentioned dicumyl peroxide, di-tert-butyl peroxide, 2,5-dimethyl-2,5-di-(tert-butylperoxy)hexane, 2,5-dimethyl-2,5-di-(tert-butylperoxy)hexine-3, 1,3-bis(-tert-butylperoxyisopropyl)benzene, 1,1-bis(tert-butylperoxy)-3,3,5-trimethylcyclohexane, n-butyl-4,4-bis(-tert-butylperoxy)valelate, benzoyl peroxide, p-chlorobenzoyl peroxide, 2,4-dichlorobenzoyl peroxide, tert-butyl peroxybenzoate, tert-butyl perbenzoate, tert-butylperoxyisopropyl carbonate, diacetyl peroxide, lauroyl peroxide and tert-butylcumyl peroxide.

Of these peroxides, in view of the smell and scorch stability, 2,5-dimethyl-2,5-di-(tert-butylperoxy)hexane, 2,5-dimethyl-2,5-di-(tert-butylperoxy)hexine-3, 1,3-bis(-tert-butylperoxyisopropyl)benzene, 1,1-bis(tert-butylperoxy)-3,3,5-trimethylcyclohexane and n-butyl-4,4-bis(tert-butylperoxy)valelate are preferred, and 1,3-bis(-tert-butylperoxyisopropyl)benzene is most preferred.

The organic peroxide is incorporated in an amount of 0.05 to 3% by weight, especially 0.1 to 1% by weight, based on the total amount of the components (a), (b) and (c).

If the organic peroxide is incorporated in an amount within the above-mentioned range, the heat resistance, the tensile characteristics, the rubbery characteristics such as elastic recovery and repulsion elasticity, and the strength are highly improved.

In the present invention, at the partial crosslinking treatment with the organic peroxide, there can be used peroxy-crosslinking assistants such as p-quinone dioxime, p,p'-dibenzoylquinone dioxime, N-methyl-N,N-dinitrosoaniline, nitrobenzene, diphenylguanidine, trimethylolpropane-N,N'-m-phenylene maleimide and N-methyl-N,N'-m-phenylene dimaleimide, divinylbenzene, triallyl isocyanurate, polyfunctional methacrylate monomers such as ethylene glycol dimethacrylate, diethylene glycol dimethacrylate, polyethylene glycol dimethacrylate, trimethylolpropane trimethacrylate and allyl methacrylate, and polyfunctional vinyl monomers such as vinyl butyrate and vinyl stearate. It is expected that if such a compound as described above is used, the crosslinking reaction will be advanced uniformly and mildly. In the present invention, especially, if divinylbenzene is used, since divinylbenzene is easy to handle, has a good compatibility with the olefinic plastic as the main component to be treated and acts as a dispersing agent for the organic peroxide by its organic peroxide-solubilizing action, a uniform crosslinking effect is attained by the heat treatment and a composition which is well-balanced between the flowability and the physical properties can be obtained. Therefore, use of divinylbenzene is most preferred in the present invention. In the present invention, it is preferred that the above-mentioned crosslinking assistant or polyfunctional vinyl monomer be incorporated in an amount of 0.1 to 2% by weight, especially 0.3 to 1% by weight, based on the total amount of the components to be treated.

If the crosslinking assistant or polyfunctional vinyl monomer is incorporated in an amount within the above-mentioned range, the flowability of the composition is improved, and even if the composition undergoes heat history, the physical properties are not changed.

A decomposition promotor may be incorporated so as to promote decomposition of the organic peroxide. As the decomposition promotor, there can be mentioned tertiary amines such as triethylamine, tributylamine and 2,4,6-tris(di-methylamino)phenol, and naphthenic acid salts of metals such as aluminum, cobalt, vanadium, manganese, magnesium, lead and mercury.

It is preferred that kneading be carried out in a closed apparatus in an atmosphere of an inert gas such as nitrogen or carbon dioxide gas. The kneading temperature is such that the half-value period of the used organic peroxide is shorter than 1 minute. More specifically, the kneading temperature is ordinarily 150° to 280° C. and preferably 170° to 240° C. The kneading time is ordinarily 1 to 20 minutes and preferably 1 to 10 minutes. The shearing force is selected so that the shearing speed is ordinarily 10 to $10^4$ sec$^{-1}$ and preferably $10^2$ to $10^3$ sec$^{-1}$.

As the kneading device, there can be mentioned a mixing roll, an intensive mixer such as a Banbury mixer, a kneader and a monoaxial or biaxial extruder, and use of a closed kneading device is preferred.

According to the present invention, by the dynamic heat treatment in the presence of the organic peroxide, partial crosslinking is effected and a thermoplastic elastomer composition graft-modified with maleic anhydride or the like is obtained. For example, as is shown in the examples given hereinafter, it is understood that the M value indicating the maleic anhydride content is increased in the composition of the present invention.

Incidentally, in the present invention, by the term "partial crosslinking", it is meant that the gel content is at least 20%, preferably 20 to 99.5%, especially preferably 45 to 98%, as determined according to the following method.

METHOD FOR DETERMINATION OF GEL CONTENT

About 100 mg of a sample of a thermoplastic elastomer is weighed and cut into small pieces having a size of 0.5 mm×0.5 mm×0.5 mm, and the cut pieces are immersed in 30 ml of cyclohexane at 23° C. for 48 hours in a sealed vessel. Then, the sample is recovered on a filler paper and dried at room temperature for more than 72 hours until the weight is not changed any more.

The weight of the cyclohexane-insoluble components except the polymer component (for example, fibrous filler, filler, pigment and the like) and the weight of the olefinic plastic in the sample before immersion in cyclohexane are subtracted from the weight of the drying residue. The obtained value is designated as "collected final weight (Y)".

The weight of the peroxide-crosslinking olefin copolymer in the sample (namely, the value obtained by subtracting ① the weight of olefinic plastic and ② the weight of the cyclohexane-soluble components other than the peroxide-crosslinking olefin copolymer rubber (for example, mineral oil and plasticizer) and ③ the weight of the cyclohexane-insoluble components other than the polymer component (for example, fibrous filler, filler, pigment and the like) from the weight of the sample) is designated as "corrected initial weight (X)".

The gel content is calculated according to the following formula:

$$\text{Gel content (\% by weight)} = \frac{\text{corrected final weight (Y)}}{\text{corrected initial weight (X)}} \times 100$$

In the present invention, by dynamically heat-treating a blend comprising at specific ratios (a) a peroxide-crosslinking olefin copolymer rubber, (b) an olefinic plastic and (c) an unsaturated carboxylic acid or a derivative thereof, optionally together with (d) a peroxide-non-crosslinking rubbery substance, (e) a mineral oil type softener and (f) a fibrous filler, in the presence of an organic peroxide to effect partial crosslinking, (that is, the gel content is within the above-mentioned range), there can be obtained a composition which is excellent in rubbery characteristics, moldability, bondability to resins and metals, strength, heat resistance and softness.

The composition of the present invention is particularly excellent in heat resistance over the mere blend (uncrosslinkable blend) of the components (a), (b) and (c) or the mere blend (uncrosslinked blend) of the peroxide-crosslinked olefin copolymer rubber component (a) graft-modified with an unsaturated carboxylic acid and the olefinic plastic component (b).

The effect of improving the flowability by incorporation of the components (d) and (e) is especially conspicuous when the gel content is in the above-mentioned range.

The so-obtained thermoplastic elastomer composition of the present invention is excellent in the moldability and can be molded by a molding apparatus customarily used for molding ordinary thermoplastic plastics, and the composition of the present invention is suitable for extrusion molding, calender molding, injection molding and the like.

Furthermore, by incorporation of an unsaturated carboxylic acid or derivative thereof such as maleic anhydride, the polymer component is graft-modified, and therefore, as is apparent from the examples given hereinafter, the heat-bondability to various resin and metals is prominently improved and the composition of the present invention is suitably used for formation of laminates or covering of metals.

The present invention will now be described in detail with reference to the following examples that by no means limit the scope of the invention.

Molding conditions for preparing test samples from elastomer compositions prepared in the examples and test methods are described below.

(1) Injection molding

Molding machine: Dynamelter (supplied by Meiki Seisakusho)

Molding temperature: 220° C.

Injection pressure: primary pressure of 1000 kg/cm$^2$ and secondary pressure of 700 kg/cm$^2$ Injection speed adopted: maximum Molding speed: 90 sec/cycle Gate: direct gate (land length of 10 mm, width of 10 mm and thickness of 3 mm)

Molded product: length of 150 mm, width of 120 mm and thickness of 3 mm (2) Extrusion molding T-die sheets were prepared by extrusion molding under the following conditions.

Molding machine: extruder having a diameter of 40 mm (supplied by Toshiba Kikai)

Screw: full-flight type (L/D=28, CR=3.5)

Screen pack: 80 mesh×2 sheets

Molding temperature: 160° C. on hopper side and 210° C. on die side

Die lip: 1.5 mm

Take-up speed: 5 m/min (3) Basic properties

Test pieces were cut out from square plates having a thickness of 3 mm, which were obtained by injection molding according to the method described in (1) above, and the basic properties were determined according to the following methods.

Tensile characteristics: method of JIS K-6301

M100: stress at 100% stretching $T_B$: tensile strength $E_B$: elongation at break Spring hardness (HS): method A of JIS K-6301 or Shore-D method of ASTM D-2240

Initial flexural modulus (FM): method of ASTM D-790

Izod impact strength (Izod): method of ASTM D-256

Permanent elongation (PS): measured by method of JIS K-6301 and expressed by residual elongation at 100% stretching Softening temperature (SP): temperature at which penetration of 0.1 mm was attained by needle having diameter of 0.8 mm under load of 49 g at temperature-elevating rate of 20° C./min in TMA-measuring apparatus supplied by du Pont (4) Bonding strength A. Preparation of test pieces The extrusion sheet (1.0 mm in thickness) of the elastomer composition molded under the conditions described in (2) above and an adherend having a thickness of 0.5 mm were press-molded (mold-clamping pressure of 50 tons) to form a test piece having a size of 150 mm×150 mm.

The following adherends were used.

Nylon: nylon 6 supplied by Toray (Amilane CM1021)

EVAL: EP-F101A supplied by Kuraray

Steel sheet: SS-41 supplied by Nippon Test Panel (sandblasted at surface roughness of 30 microns)

B. Peeling test

Test piece: punched strip having width of 25 mm and length of 100 mm

Test method: 180°, peeling

Pulling speed: 25 mm/min

Bonding strength: value (kg/cm) obtained by dividing peeling load by width of test piece Incidentally, in the case where the substrate was broken, the sample was indicated by "broken" in the following tables.

(5) M value

The M value indicating the maleic anhydride content was measured in the following procedures.

Unreacted maleic anhydride in $W_O$ g of the sample was extracted with acetone for 12 hours by using Soxhlet's extractor. The extraction residue sample was dried and press-molded at 210° C. to form a film for the infrared spectrophotometry, having a thickness of about 100 μm. With respect to the so-obtained film, the absorbance attributed to the characteristic absorption band (C=O region) of maleic anhydride was measured by an infrared spectrophotometer, and the content (% by weight) of graft-polymerized maleic anhydride in $W_O$ g of the sample was determined based on a calibration curve formed by using a reference sample standardized separately by the titration method. The so-determined maleic anhydride content was designated as the M value.

In the present invention, the content ratio between the components (a) and (b) in the elastomer composition can be determined by the D.S.C. method or the infrared absorbency analysis method. The contents of the components (d) and (e) in the composition can be determined by the solvent extraction method (Soxhlet extraction method using acetone as the solvent) or the infrared absorbance analysis method. The content ratio of the component (f) to the organic components can be determined by the thermal weight analysis method.

The content of the grafted component (c) was measured by the infrared absorbance analysis method or the chemical analysis method.

EXAMPLE 1

A blend comprising 70 parts by weight of an ethylene/propylene/ethylidene-norbornene copolymer rubber having an ethylene content of 70 mole %, an iodine value of 15 and a Mooney viscosity $M_{1+4}$ (100° C.) of 120 (hereinafter referred to as "EPDM (1)") and 30 parts by weight of polypropylene having a melt index (ASTM D-1238-65T, 230° C.) of 13 and a density of 0.91 g/cm$^3$ (hereinafter referred to as "PP") was kneaded at 190° C. for 5 minutes in a nitrogen atmosphere by a Banbury mixer, and the kneaded blend was passed through rolls and square pellets were prepared by a sheet cutter (first step).

Then, 100 parts by weight of the so-prepared pellets, 0.5 part by weight of maleic anhydride (hereinafter referred to as "MAH") and 0.3 part by weight of 1,3-bis(t-butylperoxyisopropyl)benzene hereinafter referred to as "peroxide (A)") were stirred and mixed by a Henschel mixer and the blend was extruded at 220° C. in a nitrogen atmosphere (second step).

The basic properties and bonding strength of the obtained elastomer composition are shown together with those of elastomer compositions obtained in the subsequent examples and comparative examples in Table 1.

EXAMPLE 2

An elastomer composition was prepared in the same manner as described in Example 1 except that at the second step, the amount incorporated of MAH was changed to 1.0 part by weight and 0.5 part of divinylbenzene (hereinafter referred to as "DVB") was further added.

COMPARATIVE EXAMPLE 1

An elastomer composition was prepared in the same manner as described in Example 2 except that at the second step, MAH was not incorporated.

COMPARATIVE EXAMPLE 2

An elastomer composition was prepared in the same manner as described in Example 2 except that peroxide (A) and DVB were not added.

EXAMPLE 3

In a Banbury mixer, 50 parts of EPDM (1) and 50 parts of PP were kneaded at 190° C. for 5 minutes in a nitrogen atmosphere, and the kneaded blend was passed through rolls and square pellets were formed by using a sheet cutter (first step).

Then, 100 parts by weight of the so-prepared pellets, 0.5 part by weight of MAH, 0.5 part by weight of DVB and 0.3 part by weight of peroxide (A) were stirred and mixed by a Henschel mixer.

The blend was extruded at 220° C. in a nitrogen atmosphere by an extruder to form an elastomer composition (second step).

EXAMPLE 4

An elastomer composition was prepared in the same manner as described in Example 3 except that at the second step, the amount incorporated of MAH was changed to 1.0 part by weight and DVB was not incorporated.

COMPARATIVE EXAMPLE 3

An elastomer composition was prepared in the same manner as described in Example 3 except that at the second step, MAH was not incorporated.

COMPARATIVE EXAMPLE 4

An elastomer composition was prepared in the same manner as described in Example 4 except that at the second step, peroxide (A) was not added.

EXAMPLE 5

In a Henschel mixer, 30 parts by weight of the pellets of EPDM (1), 70 parts by weight of PP, 1.0 part by weight of MAH, 0.5 part by weight of DVB and 0.3 part by weight of 2,5-dimethyl-2,5-di-(t-butylperoxy)-hexine-3 (hereinafter referred to as "peroxide (B)") were stirred and mixed.

The blend was extruded at 220° C. in a nitrogen atmosphere by a Warner biaxial extruder (L/D=43, mating type, same direction rotation, three-thread screws) to form an elastomer composition.

COMPARATIVE EXAMPLE 5

An elastomer composition was prepared in the same manner as described in Example 5 except that MAH was not incorporated.

COMPARATIVE EXAMPLE 6

An elastomer composition was prepared in the same manner as described in Example 5 except that DVB and peroxide (B) were not incorporated.

EXAMPLE 6

In a Henschel mixer, 40 parts by weight of the pellets of EPDM (1), 30 parts by weight of PP, 30 parts by weight of linear low-density polyethylene: melt index (ASTM D-1238-65T, 190° C.)=2.1. density=0.92 g/cm$^3$ (hereinafter referred to as "LLDPE"), 0.5 part by weight of MAH and 0.3 part by weight of peroxide (B) were stirred and mixed.

The blend was extruded at 200° C. in a nitrogen atmosphere by the above-mentioned Warner biaxial extruder to form an elastomer composition.

EXAMPLE 7

An elastomer composition was prepared in the same manner as described in Example 6 except that 0.5 part by weight of DVB was further incorporated.

COMPARATIVE EXAMPLE 7

An elastomer composition was prepared in the same manner as described in Example 7 except that MAH was not incorporated.

COMPARATIVE EXAMPLE 8

An elastomer composition was prepared in the same manner as described in Example 7 except that DVB and peroxide (B) were not incorporated.

TABLE 1

| | Example 1 | Example 2 | Comparative Example 1 | Comparative Example 2 | Example 3 | Example 4 | Comparative Example 3 | Comparative Example 4 | Example 5 | Comparative Example 5 | Comparative Example 6 | Example 6 | Example 7 | Comparative Example 7 | Comparative Example 8 |
|---|---|---|---|---|---|---|---|---|---|---|---|---|---|---|---|
| Composition | | | | | | | | | | | | | | | |
| EPDM (I) | 70 | 70 | 70 | 70 | 50 | 50 | 50 | 50 | 30 | 30 | 30 | 40 | 40 | 40 | 40 |
| PP | 30 | 30 | 30 | 30 | 50 | 50 | 50 | 50 | 70 | 70 | 70 | 30 | 30 | 30 | 30 |
| MAH | 0.5 | 1.0 | — | 1.0 | 0.5 | 1.0 | 0.5 | 1.0 | 1.0 | — | 1.0 | 30 | 30 | 30 | 30 |
| DVB | — | 0.5 | 0.5 | — | 0.5 | — | 0.5 | — | 0.5 | 0.5 | — | 0.5 | 0.5 | — | 0.5 |
| peroxide (A) | 0.3 | 0.3 | 0.3 | — | 0.3 | 0.3 | 0.3 | — | 0.5 | 0.5 | — | — | 0.5 | 0.5 | — |
| Basic Properties | | | | | | | | | | | | | | | |
| M100 (kg/cm²) | 44 | 46 | 45 | 38 | 75 | 72 | 75 | 50 | 115 | 113 | 98 | 82 | 85 | 86 | 65 |
| T$_B$ (kg/cm²) | 105 | 115 | 110 | 41 | 150 | 135 | 148 | 75 | 220 | 200 | 125 | 168 | 185 | 188 | 98 |
| E$_B$ (%) | 580 | 620 | 610 | 280 | 600 | 570 | 610 | 210 | 640 | 620 | 320 | 590 | 620 | 620 | 180 |
| HS (JIS A) | 83 | 84 | 84 | 78 | 95 | 94 | 95 | 89 | 53 | 51 | 47 | 40 | 42 | 42 | 35 |
| PS (%) | 21 | 18 | 20 | 31 | 28 | 30 | 28 | 45 | 6,100 | 6,000 | 5,100 | 3,100 | 3,200 | 3,200 | 2,700 |
| SP (°C.) | 138 | 142 | 140 | 75 | 145 | 144 | 145 | 91 | 150 | 148 | 120 | 125 | 128 | 127 | 95 |
| Gel content (wt %) | 95 | 97 | 97 | 2 | 65 | 67 | 60 | 2 | 49 | 47 | 2 | 78 | 82 | 77 | 3 |
| Bonding Strength | | | | | | | | | | | | | | | |
| M value | 0.5 | 0.9 | 0 | below 0.1 | 0.5 | 0.9 | 0 | below 0.1 | 0.9 | 0 | 0.03 | 0.5 | 0.5 | 0 | |
| Bonding Strength (kg/cm) to Nylon | 8.4 (partially broken) | broken | below 0.5 | below 0.5 | 7.9 (partially broken) | broken | below 0.5 | below 0.5 | broken | below | below | broken | broken | below | below |
| Bonding Strength (kg/cm) to Fe | broken | broken | below 0.5 | below 0.5 | broken | broken | below 0.5 | below 0.5 | broken | below 0.5 | below 0.5 | broken | broken | below 0.5 | below 0.5 |
| Bonding Strength (kg/cm) to EVAL | 7.1 (partially broken) | broken | below 0.5 | below 0.5 | 7.2 (partially broken) | broken | below 0.5 | below 0.5 | broken | below 0.5 | below 0.5 | broken | broken | below 0.5 | below 0.5 |

EXAMPLE 8

Square pellets were prepared by kneading 70 parts by weight of EPDM (1), 30 parts by weight of PP, 10 parts by weight of butyl rubber (IIR-065 supplied by Esso, unsaturation degree=0.8 mole %) (hereinafter referred to as "IIR") and 30 parts by weight of paraffinic process oil (hereinafter referred to "Oil") in the same manner as described in Example 1 (first step).

Then, 100 parts by weight of the so-prepared pellets, 0.3 part by weight of MAH, 0.3 part by weight peroxide (A) and 0.3 part by weight of DVB were stirred and mixed by a Henschel mixer, and the blend was extruded at 220° C. in a nitrogen atmosphere by using an extruder (second step).

The basic properties and bonding strength of the obtained elastomer composition are shown together with those of elastomer compositions prepared in the subsequent examples and comparative examples in Table 2.

EXAMPLES 9 THROUGH 11

Elastomer compositions were prepared in the same manner as described in Example 8 except that at the second step the amounts incorporated of MAH and DVB were changed as shown in Table 2.

COMPARATIVE EXAMPLE 9

An elastomer composition was prepared in the same manner as described in Example 8 except that at the second step, MAH was not incorporated.

COMPARATIVE EXAMPLE 10

An elastomer composition was prepared in the same manner as described in Example 10 except that at the second step, peroxide (A) and DVB were not incorporated.

EXAMPLE 12

By using a Banbury mixer, 50 parts of EPDM (1), 50 parts by weight of PP, 10 parts by weight of IIR and 10 parts by weight of Oil were kneaded at 190° C. for 5 minutes in a nitrogen atmosphere, and the blend was passed through rolls and square pellets were prepared by using a sheet cutter (first step).

Then, 100 parts by weight of the so-prepared pellets, 0.5 part by weight of MAH, 0.5 part by weight of DVB and 0.3 part by weight of peroxide (A) were stirred and mixed by a Henschel mixer.

Then, the blend was extruded at 220° C. in a nitrogen atmosphere by an extruder to prepare an elastomer composition (second step).

EXAMPLE 13

An elastomer composition was prepared in the same manner as described in Example 12 except that at the second step, the amount incorporated of MAH was changed to 1.0 part by weight and DVB was not incorporated.

COMPARATIVE EXAMPLE 11

An elastomer composition was prepared in the same manner as described in Example 12 except that at the second step, MAH was not incorporated.

COMPARATIVE EXAMPLE 12

An elastomer composition was prepared in the same manner as described in Example 12 except that at the second step, peroxide (A) and DVB were not incorporated.

EXAMPLE 14

In a Henschel mixer, 60 parts by weight of a pelletized ethylene/propylene/ethylidene-norbornene copolymer [ethylene content=78 mole %, iodine value=10, Mooney viscosity $ML_{1+4}$ (100° C.)=160, extended oil content=40% by weight (43 parts by weight of EPDM and 17 parts by weight of oil) (hereinafter referred to as "EPDM (2)"), 40 parts by weight of PP, 0.5 part by weight of MAH, 0.3 part by weight of peroxide (B) and 0.5 part by weight of DVB were stirred and mixed.

Then, the mixture was extruded at 220° C. in a nitrogen atmosphere by using a Warner biaxial extruder (L/D=43, mating type, same direction rotation, three-thread screws) to obtain a thermoplastic elastomer composition.

EXAMPLE 15

An elastomer composition was prepared in the same manner as described in Example 14 except that the amount incorporated of MAH was changed to 1.0 part by weight and DVB was not incorporated.

COMPARATIVE EXAMPLE 13

An elastomer composition was prepared in the same manner as described in Example 14 except that MAH was not incorporated.

EXAMPLE 16

In a Henschel mixer, 35 parts by weight of pelletized EPDM (2) (25 parts by weight of EPDM and 10 parts by weight of oil), 65 parts by weight of PP, 0.5 part by weight of MAH, 0.5 part by weight of DVB and 0.3 part by weight of peroxide (B) were stirred and mixed.

Then, the mixture was extruded at 220° C. in a nitrogen atmosphere by the above-mentioned Warner biaxial extruder to obtain an elastomer composition.

EXAMPLE 17

An elastomer composition was prepared in the same manner as described in Example 16 except that the amount incorporated of MAH was changed to 1.0 part by weight.

COMPARATIVE EXAMPLE 14

An elastomer composition was prepared in the same manner as described in Example 16 except that MAH was not incorporated.

COMPARATIVE EXAMPLE 15

An elastomer composition was prepared in the same manner as described in Example 16 except that DVB and peroxide (B) were not incorporated.

TABLE 2

| Example | Example | Example | Example | Comparative | Comparative | Example | Example | Comparative | Comparative |

TABLE 2-continued

| | 8 | 9 | 10 | 11 | Example 9 | Example 10 | 12 | 13 | Example 11 | Example 12 |
|---|---|---|---|---|---|---|---|---|---|---|
| Composition | | | | | | | | | | |
| EPDM (1) | 70 | 70 | 70 | 70 | 70 | 70 | 50 | 50 | 50 | 50 |
| PP | 30 | 30 | 30 | 30 | 30 | 30 | 50 | 50 | 50 | 50 |
| IIR | 10 | 10 | 10 | 10 | 10 | 10 | 10 | 10 | 10 | 10 |
| Oil | 30 | 30 | 30 | 30 | 30 | 30 | 10 | 10 | 10 | 10 |
| MAH | 0.3 | 0.5 | 1.0 | 2.0 | — | 1.0 | 0.5 | 1.0 | — | 0.5 |
| DVB | 0.5 | — | 0.5 | — | 0.5 | — | 0.5 | — | 0.5 | — |
| peroxide (A) | 0.3 | 0.3 | 0.3 | 0.3 | 0.3 | — | 0.3 | 0.3 | 0.3 | — |
| Basic Properties | | | | | | | | | | |
| M100 (kg/cm$^2$) | 27 | 26 | 28 | 28 | 26 | 20 | 75 | 64 | 75 | 52 |
| $T_B$ (kg/cm$^2$) | 83 | 80 | 85 | 84 | 81 | 42 | 165 | 145 | 160 | 85 |
| $E_B$ (%) | 630 | 600 | 640 | 620 | 640 | 310 | 590 | 580 | 580 | 280 |
| HS (JISA) | 68 | 68 | 69 | 68 | 69 | 63 | 83 | 82 | 83 | 79 |
| PS (%) | 10 | 10 | 8 | 9 | 11 | 19 | 25 | 27 | 26 | 41 |
| SP (°C.) | 120 | 121 | 123 | 121 | 118 | 65 | 145 | 143 | 146 | 79 |
| Gel content (wt %) | 95 | 98 | 98 | 98 | 94 | 2 | 69 | 68 | 68 | 2 |
| Bonding Strength | | | | | | | | | | |
| M value | 0.3 | 0.5 | 0.9 | 1.8 | 0 | below 0.1 | 0.5 | 0.9 | 0 | below 0.1 |
| Bonding Strength (kg/cm) to Nylon | 4.5 | 7.6 (partially broken) | broken | broken | below 0.5 | below 0.5 | 7.9 (partially broken) | broken | below 0.5 | below 0.5 |
| Bonding Strength (kg/cm) to Fe | 6.5 | broken | broken | broken | below 0.5 | below 0.5 | broken | broken | below 0.5 | below 0.5 |
| Bonding Strength (kg/cm) to EVAL | 3.8 | 6.8 (partially broken) | broken | broken | below 0.5 | below 0.5 | broken | broken | below 0.5 | below 0.5 |

| | Example 14 | Example 15 | Comparative Example 13 | Example 16 | Example 17 | Comparative Example 14 | Comparative Example 15 |
|---|---|---|---|---|---|---|---|
| Composition | | | | | | | |
| EPDM (2) | 60 | 60 | 60 | 35 | 35 | 35 | 35 |
| (EPDM) | (43) | (43) | (43) | (25) | (25) | (25) | (25) |
| (oil) | (17) | (17) | (17) | (10) | (10) | (10) | (10) |
| EPDM (1) | | | | | | | |
| PP | 40 | 40 | 40 | 65 | 65 | 65 | 65 |
| MAH | 0.5 | 1.0 | — | 0.5 | 1.0 | — | 1.0 |
| DVB | 0.5 | — | 0.5 | 0.5 | 0.5 | 0.5 | — |
| peroxide (B) | 0.3 | 0.3 | 0.3 | 0.3 | 0.3 | 0.3 | — |
| Basic Properties | | | | | | | |
| M100 (kg/cm$^2$) | 70 | 71 | 71 | 110 | 115 | 105 | 92 |
| $T_B$ (kg/cm$^2$) | 150 | 145 | 145 | 210 | 230 | 195 | 115 |
| $E_B$ (%) | 620 | 580 | 630 | 680 | 680 | 660 | 310 |
| HS (shore-D) | 38 | 37 | 38 | 51 | 52 | 50 | 45 |
| FM (kg/cm$^2$) | 2,500 | 2,400 | 2,400 | 5,500 | 5,600 | 5,400 | 4,900 |
| SP (°C.) | 146 | 145 | 145 | 152 | 154 | 151 | 118 |
| Gel content (wt %) | 67 | 65 | 66 | 51 | 55 | 50 | 2 |
| Bonding Strength | | | | | | | |
| M value | 0.5 | 0.9 | 0 | 0.5 | 0.9 | 0 | below 0.1 |
| Bonding Strength (kg/cm) to Nylon | 8.2 (partially broken) | broken | below 0.5 | 8.8 (partially broken) | broken | below 0.5 | below 0.5 |
| Bonding Strength (kg/cm) to Fe | broken | broken | below 0.5 | broken | broken | below 0.5 | below 0.5 |
| Bonding Strength (kg/cm) to EVAL | 7.3 (partially broken) | broken | below 0.5 | 7.5 (partially broken) | broken | below 0.5 | below 0.5 |

EXAMPLE 18

A mixture comprising 20 parts by weight of EPDM (1), 60 parts by weight of PP, 10 parts by weight of IIR, 10 parts by weight of Oil and 5 parts by weight of a milled glass fiber ("Micro Glass Milled Fiber RX-EMFP" supplied by Nippon Sheet Glass, fiber diameter = 11 μm, average fiber length = 240 μm) (hereinafter referred to as "Milled Glass Fiber") was kneaded and square pellets were prepared in the same manner as described in Example 1 (first step).

Then, 100 parts by weight of the so-prepared pellets, 0.3 part by weight of peroxide (A), 0.5 part by weight of DVB and 0.5 part by weight of MAH were mixed and extruded at 220° C. in a nitrogen atmosphere by an extruder (second step).

EXAMPLES 19 THROUGH 24

The procedures of Example 18 were repeated in the same manner except that at the first step, the kind and amount of the filler were changed as shown in Table 3. The following fillers were used. (Glass Flake)

A scaly filmy glass having a thickness of 3 μm and a 325 mesh-pass fraction content higher than 88% (Micro Glass Flake EF325 supplied by Nippon Sheet Glass; hereinafter referred to as "Glass Flake"). (Potassium Titanate Fiber)

A potassium titanate fiber having a fiber diameter of 0.2 to 0.5 μm and an average fiber length of 10 to 20 μm (Tismo D supplied by Otsuka Kagaku Yakuhin; hereinafter referred to as "Potassium Titanate")

COMPARATIVE EXAMPLES 16 AND 17

The procedures of Example 19 were repeated in the same manner except that the filler was not incorporated at the first step or maleic anhydride was not incorporated at the second step.

The physical properties of the compositions obtained in Example 18 through 24 and Comparative Examples 16 and 17 are shown in Table 3.

Then, the blend was extruded at 230° C. in a nitrogen atmosphere by a Warner biaxial extruder (L/D=43, mating type, same direction rotation, three-thread screws) (first step).

Then, 100 parts of the obtained pellets were kneaded with 5 parts by weight of Milled Glass Fiber at 200° C. for 5 minutes in a nitrogen atmosphere by a Banbury mixer, and the kneaded mixture was passed through rolls and square pellets were prepared by a sheet cutter (second step).

TABLE 3

| | Example 18 | Example 19 | Example 20 | Example 21 | Example 22 | Example 23 | Example 24 | Comparative Example 16 | Comparative Example 17 |
|---|---|---|---|---|---|---|---|---|---|
| Composition | | | | | | | | | |
| First Step H | | | | | | | | | |
| Polymer | | | | | | | | | |
| EPDM (1) | 20 | 20 | 20 | 20 | 20 | 20 | 20 | 20 | 20 |
| PP | 60 | 60 | 60 | 60 | 60 | 60 | 60 | 60 | 60 |
| OIL | 10 | 10 | 10 | 10 | 10 | 10 | 10 | 10 | 10 |
| IIR | 10 | 10 | 10 | 10 | 10 | 10 | 10 | 10 | 10 |
| Fibrous Filler | | | | | | | | | |
| Milled Glass Fiber | 5 | 15 | 25 | | | | | | 15 |
| Glass Flake | | | | 15 | | | | | |
| Potassium Titanate | | | | | 5 | 15 | 25 | | |
| Second Step | | | | | | | | | |
| (H) | 100 | 100 | 100 | 100 | 100 | 100 | 100 | 100 | 100 |
| MAH | 0.5 | 0.5 | 0.5 | 0.5 | 0.5 | 0.5 | 0.5 | 0.5 | |
| DVB | 0.5 | 0.5 | 0.5 | 0.5 | 0.5 | 0.5 | 0.5 | 0.5 | 0.5 |
| peroxide (A) | 0.3 | 0.3 | 0.3 | 0.3 | 0.3 | 0.3 | 0.3 | 0.3 | 0.3 |
| Basic Properties | | | | | | | | | |
| M100 (Kgf/cm$^2$) | 113 | 145 | 185 | 120 | 115 | 138 | 170 | 100 | 135 |
| $T_B$ (kgf/cm$^2$) | 210 | 248 | 280 | 225 | 205 | 240 | 265 | 190 | 140 |
| $E_B$ (%) | 620 | 580 | 530 | 510 | 610 | 550 | 520 | 650 | 280 |
| HS (shore-D) | 49 | 53 | 57 | 51 | 49 | 52 | 55 | 47 | 51 |
| Gel content (wt %) | 47 | 48 | 47 | 47 | 47 | 48 | 48 | 47 | 46 |
| Other Properties | | | | | | | | | |
| Heat Resistance-heat sagging (mm) (120° C.) | 5 | 3 | 2 | 6 | 6 | 3 | 2 | 8 | 5 |
| Cold Resistance-Izod impact strength (kg · cm/cm) (−20° C.) | NB* | NB* | 26.8 | NB* | NB* | NB* | 29.1 | NB* | NB* |
| Shape Stability-initial flexural modulus (kgf/cm$^2$) | 4,600 | 5,000 | 5,500 | 4,800 | 4,500 | 4,900 | 5,200 | 4,200 | 4,400 |
| Dimension Stability-linear expansion coefficient × $10^{-6}$ (mm/mm/°C.) | 110 | 80 | 60 | 110 | 120 | 80 | 70 | 140 | 130 |

Note
*: "NB" indicates "not broken"

EXAMPLE 25

A mixture comprising 50 parts by weight of a pelletized ethylene/propylene/ethylidene-norbornene copolymer rubber [ethylene content=78 mole %, iodine value=10, Mooney viscosity $ML_{1+4}$ (100° C.)=160, extended oil content=30% by weight (15 parts by weight of oil)] [hereinafter referred to as "EPDM (3)"], 50 parts by weight of PP, 0.5 part by weight of MAH, 0.5 part by weight of DVB and 0.3 part by weight of peroxide (B) was stirred and blended by a Henschel mixer.

EXAMPLES 26 THROUGH 31

The procedures of Example 25 were repeated in the same manner except that at the second step, the kind and amount of the filler were changed as shown in Table 4.

COMPARATIVE EXAMPLES 18 AND 19

The procedures of Example 27 were repeated in the same manner except that the filler was not incorporated at the second step or MAH was not incorporated at the first step.

The physical properties of the compositions prepared in Examples 25 through 31 and Comparative Examples 18 and 19 are shown in Table 4.

TABLE 4

| | Example 25 | Example 26 | Example 27 | Example 28 | Example 29 | Example 30 | Example 31 | Comparative Example 18 | Comparative Example 19 |
|---|---|---|---|---|---|---|---|---|---|
| Composition | | | | | | | | | |
| First Step I | | | | | | | | | |

TABLE 4-continued

|  | Example 25 | Example 26 | Example 27 | Example 28 | Example 29 | Example 30 | Example 31 | Comparative Example 18 | Comparative Example 19 |
|---|---|---|---|---|---|---|---|---|---|
| Polymer | | | | | | | | | |
| EPDM (3) | 50 | 50 | 50 | 50 | 50 | 50 | 50 | 50 | 50 |
| (EPDM) | (35) | (35) | (35) | (35) | (35) | (35) | (35) | (35) | (35) |
| (OIL) | (15) | (15) | (15) | (15) | (15) | (15) | (15) | (15) | (15) |
| PP | 50 | 50 | 50 | 50 | 50 | 50 | 50 | 50 | 50 |
| MAH | 0.5 | 0.5 | 0.5 | 0.5 | 0.5 | 0.5 | 0.5 | 0.5 | — |
| DVB | 0.5 | 0.5 | 0.5 | 0.5 | 0.5 | 0.5 | 0.5 | 0.5 | 0.5 |
| peroxide (B) | 0.3 | 0.3 | 0.3 | 0.3 | 0.3 | 0.3 | 0.3 | 0.3 | 0.3 |
| Second Step | | | | | | | | | |
| Fibrous Filler | | | | | | | | | |
| (I) | 100 | 100 | 100 | 100 | 100 | 100 | 100 | 100 | 100 |
| Milled Glass Fiber | 5 | 10 | 15 | | | | | — | 15 |
| Glass Flake | | | | 10 | | | | — | |
| Potassium Titanate | | | | | 10 | 20 | 30 | — | |
| Basic Properties | | | | | | | | | |
| M100 (Kgf/cm$^2$) | 87 | 97 | 106 | 85 | 90 | 107 | 135 | 80 | 100 |
| T$_B$ (Kgf/cm$^2$) | 168 | 185 | 210 | 170 | 175 | 220 | 265 | 150 | 110 |
| E$_B$ (%) | 560 | 520 | 490 | 490 | 510 | 460 | 420 | 600 | 210 |
| HS (shore-D) | 43 | 44 | 46 | 43 | 44 | 46 | 48 | 41 | 43 |
| Gel content (wt %) | 57 | 56 | 57 | 57 | 56 | 56 | 56 | 56 | 54 |
| Other Properties | | | | | | | | | |
| Heat Resistance-heat sagging (mm) (120° C.) | 5 | 4 | 3 | 7 | 5 | 3 | 2 | 8 | 5 |
| Cold Resistance-Izod impact strength (kg·cm/cm) (−20° C.) | NB* | NB* | NB* | NB* | NB* | NB* | 24.8 | NB* | NB* |
| Shape Stability-initial flexural modulus (Kgf/cm$^2$) | 3,400 | 3,900 | 4,100 | 3,400 | 3,700 | 4,300 | 5,100 | 3,100 | 3,800 |
| Dimension Stability-linear expansion coefficient × 10$^{-6}$ (mm/mm/°C.) | 120 | 90 | 70 | 110 | 100 | 70 | 60 | 160 | 110 |

Note
*: "NB" indicates "not broken"

EXAMPLE 32

A composition comprising 70 parts by weight of EPDM (3) (50 parts by weight of EPDM and 20 parts by weight of oil), 30 parts by weight of PP, 0.5 part by weight of MAH, 0.5 part by weight of DVB and 5 parts by weight of Milled Glass Fiber was stirred by a Henschel mixer. The resulting mixture was extruded at 230° C. in a nitrogen atmosphere by the above-mentioned Warner biaxial extruder (first step).

In a Banbury mixer, 100 parts by weight of the so-obtained pellets were kneaded with 5 parts by weight of Milled Glass Fiber at 200° C. for 5 minutes in a nitrogen atmosphere, and the kneaded mixture was passed through rolls and square pellets were prepared by a sheet cutter (second step).

EXAMPLES 33 THROUGH 38

The procedures of Example 32 were repeated in the same manner except that at the second step, the kind and amount of the filler were changed as shown in Table 5.

COMPARATIVE EXAMPLES 20 AND 21

The procedures of Example 32 were repeated in the same manner except that the filler was not incorporated at the second step or MAH was not incorporated at the first step.

The physical properties of the compositions obtained in Examples 32 through 38 and Comparative Examples 20 and 21 are shown in Table 5.

EXAMPLE 39

The procedures of Example 22 were repeated in the same manner except that two kinds of fillers were used in combination at the second step, as shown in Table 5. The obtained results are shown in Table 5.

TABLE 5

|  | Example 32 | Example 33 | Example 34 | Example 35 | Example 36 | Example 37 | Example 38 | Comparative Example 20 | Comparative Example 21 | Example 39 |
|---|---|---|---|---|---|---|---|---|---|---|
| Composition | | | | | | | | | | |
| Polymer | | | | | | | | | | |
| EPDM (3) | 70 | 70 | 70 | 70 | 70 | 70 | 70 | 70 | 70 | 70 |
| (EPDM) | (50) | (50) | (50) | (50) | (50) | (50) | (50) | (50) | (50) | (50) |
| (OIL) | (20) | (20) | (20) | (20) | (20) | (20) | (20) | (20) | (20) | (20) |
| PP | 30 | 30 | 30 | 30 | 30 | 30 | 30 | 30 | 30 | 30 |
| Fibrous Filler | | | | | | | | | | |
| Milled Glass Fiber | 5 | 10 | 20 | | | | | | 10 | |
| Glass Flake | | | | 10 | | | | | 10 | |
| Potassium Titanate | | | | | 10 | 20 | 30 | | | 10 |
| Additive | | | | | | | | | | |

TABLE 5-continued

|  | Example 32 | Example 33 | Example 34 | Example 35 | Example 36 | Example 37 | Example 38 | Comparative Example 20 | Comparative Example 21 | Example 39 |
|---|---|---|---|---|---|---|---|---|---|---|
| MAH | 0.5 | 0.5 | 0.5 | 0.5 | 0.5 | 0.5 | 0.5 | 0.5 | — | 0.5 |
| DVB | 0.5 | 0.5 | 0.5 | 0.5 | 0.5 | 0.5 | 0.5 | 0.5 | 0.5 | 0.5 |
| peroxide (B) | 0.3 | 0.3 | 0.3 | 0.3 | 0.3 | 0.3 | 0.3 | 0.3 | 0.3 | 0.3 |
| Basic Properties |  |  |  |  |  |  |  |  |  |  |
| M100 (Kgf/cm$^2$) | 69 | 78 | 100 | 70 | 75 | 92 | 115 | 60 | 72 | 88 |
| $T_B$ (Kgf/cm$^2$) | 135 | 155 | 195 | 135 | 145 | 180 | 225 | 120 | 85 | 175 |
| $E_B$ (%) | 530 | 490 | 430 | 450 | 480 | 430 | 400 | 580 | 240 | 440 |
| HS (Shore-D) | 3 | 7 39 | 41 | 37 | 38 | 40 | 44 | 35 | 37 | 40 |
| Gel content (wt %) | 77 | 78 | 78 | 77 | 77 | 77 | 78 | 77 | 73 | 77 |
| Other Properties |  |  |  |  |  |  |  |  |  |  |
| Heat Resistance-heat sagging (mm) (120° C.) | 11 | 8 | 5 | 9 | 8 | 4 | 3 | 16 | 14 | 5 |
| Cold Resistance-Izod impact strength (kg · cm/cm) (−20° C.) | NB* | NB* | NB* | NB* | NB* | NB* | 22.8 | NB* | NB* | NB* |
| Shape Stability-initial flexural modulus (Kgf/cm$^2$) | 2,400 | 2,800 | 3,800 | 2,400 | 2,700 | 3,500 | 4,300 | 2,000 | 2,300 | 3,500 |
| Dimension Stability-linear expansion coefficient × 10$^{-6}$ (mm/mm/°C.) | 110 | 80 | 60 | 100 | 90 | 70 | 50 | 160 | 140 | 70 |

Note
*: "NB" indicates "not broken"

EXAMPLE 40

Square pellets were prepared in the same manner as described in Example 1 from 100 parts by weight of EPDM (1), 3 parts by weight of MAH, 20 parts by weight of IIR, 30 parts by weight of Oil, 0.5 part by weight of DVB and 0.3 part by weight of peroxide (A) (first step).

Then, 70 parts by weight of the pellets were mixed with 30 parts by weight of PP by a blender, and the mixture was extruded at 220° C. in a nitrogen atmosphere by an extruder to obtain a thermoplastic elastomer composition (second step).

The basic properties and bonding strength of the obtained elastomer composition are shown together with those of elastomer compositions obtained in the subsequent examples and comparative examples in Table 6.

EXAMPLE 41

An elastomer composition was prepared in Example 40 except that at the second step, each of the amounts incorporated of the pellets and PP was changed to 50 parts by weight.

EXAMPLE 42

An elastomer composition was prepared in Example 40 except that high-density polyethylene [density=0.97 g/cm$^3$, melt index (ASTM D-1238-65T, 190° C.)=5.3 g/10 min] (hereinafter referred to as "HDPE") was used instead of PP at the second step.

EXAMPLE 43

An elastomer composition was prepared in the same manner as described in Example 40 except that linear low-density polyethylene (density=0.92 g/cm$^3$, melt index=6.0 g/10 min) (hereinafter referred to as "LLDPE") was used instead of PP at the second step.

EXAMPLE 44

An elastomer composition was prepared in the same manner as described in Example 40 except that low-density polyethylene [density=0.92 g/cm$^3$, melt index=3.0 g/10 min] (hereinafter referred to as "LDPE") was used instead of PP at the second step.

EXAMPLE 45

An elastomer composition was prepared in the same manner as described in Example 40 except that at the second step, the amount of the pellets obtained at the first step was changed to 50 parts by weight, and 25 parts by weight of PP used in Example 40 and 25 parts by weight of LLDPE used in Example 43 were incorporated.

COMPARATIVE EXAMPLES 22 AND 23

Elastomer compositions were prepared in the same manner as described in Example 40 or 43 except that maleic anhydride was not incorporated at the first step.

COMPARATIVE EXAMPLES 24 AND 25

Elastomer compositions were prepared in the same manner as described in Example 40 or 43 except that divinylbenzene and maleic anhydride were not incorporated at the first step.

EXAMPLE 46

An elastomer composition was prepared in the same manner as described in Example 40 except that Oil and IIR were not incorporated at the first step.

EXAMPLE 47

In a Henschel mixer, 140 parts by weight of EPDM (2), 3 parts by weight of MAH, 0.5 part by weight of DVB and 0.3 part by weight of peroxide (B) were stirred and mixed.

The blend was extruded at 220° C. in a nitrogen atmosphere by a Warner biaxial extruder (L/D=43, mating type, same direction rotation, three-thread screws) to form a graft-modified composition (A) (first step).

Then, 80 parts by weight of the graft-modified composition was mixed with 20 parts by weight of PP by a blender, and the blend was extruded at 220° C. in a nitrogen atmosphere by an extruder to obtain an intended thermoplastic elastomer composition.

EXAMPLE 48

An elastomer composition was prepared in the same manner as described in Example 47 except that at the second step, the grafted composition/polypropylene mixing ratio was changed to 60/40.

EXAMPLE 49

An elastomer composition was prepared in the same manner as described in Example 48 except that at the second step, HDPE used in Example 42 was used instead of PP.

EXAMPLE 50

An elastomer composition was prepared in the same manner as described in Example 48 except that at the second step, LLDPE used in Example 43 was used instead of PP.

EXAMPLE 51

An elastomer composition was prepared in the same manner as described in Example 48 except that at the second step, LDPE used in Example 44 was used instead of PP.

EXAMPLE 52

An elastomer composition was prepared in the same manner as described in Example 47 except that at the second step, 40 parts by weight of the graft-modified composition, 30 parts by weight of PP and 30 parts by weight of LLDPE were incorporated.

COMPARATIVE EXAMPLES 26 AND 27

Elastomer compositions were prepared in the same manner as described in Example 47 or 49 except that at the first step, MAH was not incorporated.

COMPARATIVE EXAMPLES 28 AND 29

Elastomer compositions were prepared in the same manner as described in Example 47 or 49 except that at the first step, DVS and peroxide B were not incorporated.

TABLE 6

| | Example 40 | Example 41 | Example 42 | Example 43 | Example 44 | Example 45 | Comparative Example 22 | Comparative Example 23 | Comparative Example 24 | Comparative Example 25 | Example 46 |
|---|---|---|---|---|---|---|---|---|---|---|---|
| Composition | | | | | | | | | | | |
| First Step | | | | | | | | | | | |
| EPDM (1) | 100 | 100 | 100 | 100 | 100 | 100 | 100 | 100 | 100 | 100 | 100 |
| Oil | 30 | 30 | 30 | 30 | 30 | 30 | 30 | 30 | 30 | 30 | — |
| IIR | 20 | 20 | 20 | 20 | 20 | 20 | 20 | 20 | 20 | 20 | — |
| MAH | 3 | 3 | 3 | 3 | 3 | 3 | — | — | 3 | 3 | 3 |
| DVB | 0.5 | 0.5 | 0.5 | 0.5 | 0.5 | 0.5 | 0.5 | 0.5 | — | — | 0.5 |
| peroxide (A) | 0.3 | 0.3 | 0.3 | 0.3 | 0.3 | 0.3 | 0.3 | 0.3 | — | — | 0.5 |
| Second step | | | | | | | | | | | |
| graft-modified composition | 70 | 50 | 70 | 70 | 70 | 50 | 70 | 70 | 70 | 70 | 70 |
| PP | 30 | 50 | — | — | — | 25 | 30 | — | 30 | — | 30 |
| HDPE | — | — | 30 | — | — | — | — | — | — | — | — |
| LLDPE | — | — | — | 30 | — | 25 | — | 30 | — | 30 | — |
| LDPE | — | — | — | — | 30 | — | — | — | — | — | — |
| Basic Properties | | | | | | | | | | | |
| M100 (kg/cm$^2$) | 25 | 40 | 23 | 21 | 19 | 38 | 25 | 22 | 20 | 16 | 31 |
| $T_B$ (Kg/cm$^2$) | 80 | 125 | 75 | 95 | 70 | 140 | 84 | 90 | 45 | 40 | 95 |
| $E_B$ (%) | 500 | 600 | 480 | 550 | 550 | 580 | 550 | 550 | 280 | 290 | 450 |
| HS (JIS A) (Shore-D) | 70 | 85 | 67 | 65 | 63 | 82 | 69 | 64 | 65 | 60 | 78 |
| FM (Kg/cm$^2$) | | | | | | | | | | | |
| SP (°C.) | 125 | 145 | 110 | 105 | 95 | 130 | 124 | 106 | 75 | 60 | 127 |
| Gel content (wt %) | 95 | 95 | 96 | 96 | 96 | 96 | 92 | 93 | 2 | 2 | 97 |
| Bonding Strength | | | | | | | | | | | |
| M Value | 1.2 | 0.8 | 1.1 | 1.1 | 1.2 | 0.8 | 0 | 0 | below 0.1 | below 0.1 | 1.0 |
| Bonding Strength (kg/cm) to Nylon | broken | broken | broken | broken | broken | broken | below 0.1 | below 0.1 | below 0.1 | below 0.1 | broken |
| Bonding Strength (kg/cm) to Fe | broken | broken | broken | broken | broken | broken | below 0.1 | below 0.1 | below 0.1 | below 0.1 | broken |
| Bonding Strength (kg/cm) to EVAL | broken | broken | broken | broken | broken | broken | below 0.1 | below 0.1 | below 0.1 | below 0.1 | broken |

| | Example 52 | Comparative Example 26 | Comparative Example 27 | Comparative Example 28 | Comparative Example 29 | Example 47 | Example 48 | Example 49 | Example 50 | Example 51 |
|---|---|---|---|---|---|---|---|---|---|---|
| Composition | | | | | | | | | | |
| First Step | | | | | | | | | | |
| EPDM (2) | 140 | 140 | 140 | 140 | 140 | 140 | 140 | 140 | 140 | 140 |
| EPDM (Oil) | (100) (40) | (100) (40) | (100) (40) | (100) (40) | (100) (40) | (100) (40) | (100) (40) | (100) (40) | (100) (40) | (100) (40) |
| MAH | 3 | — | — | 3 | 3 | 3 | — | — | 3 | 3 |
| DVB | 0.5 | 0.5 | 0.5 | — | — | 0.5 | 0.5 | 0.5 | 0.5 | 0.5 |
| peroxide (B) | 0.3 | 0.3 | 0.3 | — | — | 0.3 | 0.3 | 0.3 | 0.3 | 0.3 |
| Second Step | | | | | | | | | | |
| Graft-modified composition | 40 | 60 | 60 | 60 | 60 | 80 | 60 | 60 | 60 | 60 |
| PP | 30 | 40 | — | 40 | — | 20 | 40 | — | — | — |
| HDPE | — | — | — | — | — | — | — | 40 | — | — |
| LLDPE | 30 | — | 40 | — | 40 | — | — | — | 40 | — |

TABLE 6-continued

| | | | | | | | | | | |
|---|---|---|---|---|---|---|---|---|---|---|
| LDPE | — | — | — | — | — | — | — | — | — | 40 |
| Basic Properties | | | | | | | | | | |
| M100 (kg/cm²) | 45 | 34 | 29 | 25 | 20 | 20 | 34 | 30 | 28 | 26 |
| $T_B$ (kg/cm²) | 165 | 90 | 115 | 60 | 55 | 70 | 95 | 70 | 110 | 75 |
| $E_B$ (%) | 590 | 580 | 600 | 280 | 310 | 550 | 600 | 500 | 610 | 550 |
| HS (JISA) (shore-D) | 87 | 80 | 72 | 75 | 65 | 65 | 80 | 75 | 73 | 71 |
| FM (kg/cm²) | | | | | | | | | | |
| SP (°C.) | 145 | 137 | 109 | 79 | 68 | 120 | 138 | 117 | 110 | 102 |
| Gel content (wt %) | 97 | 95 | 95 | 2 | 2 | 97 | 98 | 98 | 98 | 97 |
| Bonding Strength | | | | | | | | | | |
| M Value | 0.7 | 0 | 0 | below 0.1 | below 0.1 | 1.5 | 1.0 | 0.9 | 1.0 | 0.9 |
| Bonding Strength (kg/cm) to Nylon | broken | below 0.1 | below 0.1 | below 0.1 | below 0.1 | broken | broken | broken | broken | broken |
| Bonding Strength (kg/cm) to Fe | broken | below 0.1 | below 0.1 | below 0.1 | below 0.1 | broken | broken | broken | broken | broken |
| Bonding Strength (kg/cm) to EVAL | broken | below 0.1 | below 0.1 | below 0.1 | below 0.1 | broken | broken | broken | broken | broken |

EXAMPLE 53

Square pellets (hereinafter referred to as "thermoplastic elastomer A") were prepared in the same manner as described in Example 1 from 78 parts by weight of EPDM (1), 22 parts by weight of PP, 0.5 part by weight of MAH, 0.5 part by weight of DVB and 0.3 part by weight of peroxide (A) (the first step).

Then, 90 parts by weight of thermoplastic elastomer A was mixed with 10 parts by weight of PP by means of a blender and the mixture was extruded at 220° C. in a nitrogen atmosphere by an extruder to obtain a thermoplastic elastomer composition (hereinafter referred to as "thermoplastic elastomer B") (the second step).

The basic properties and bonding strength of the obtained elastomer composition and those of elastomer compositions obtained in the subsequent examples are shown in Table 7.

EXAMPLES 54 THROUGH 61

Thermoplastic elastomers B were prepared in the same manner as described in Example 53 except that the kinds and amounts of the components were changed as shown in Table 7.

TABLE 7

| Composition | Example 53 | 54 | 55 | 56 | 57 | 58 | 59 | 60 | 61 |
|---|---|---|---|---|---|---|---|---|---|
| Composition of thermoplastic elastomer A | | | | | | | | | |
| EPDM (1) | 78 | 82 | 88 | 78 | 95 | 88 | 88 | 58 | 67 |
| IIR | | | | | | | | 17 | 19 |
| Oil | | | | | | | | 8 | 10 |
| PP | 22 | 18 | 12 | 22 | 5 | 12 | 12 | 17 | 4 |
| MAH | 0.5 | 0.5 | 0.5 | 0.5 | 0.5 | 0.5 | 0.5 | 0.5 | 0.5 |
| DVB | 0.5 | 0.5 | 0.5 | 0.5 | 0.5 | 0.5 | 0.5 | 0.5 | 0.5 |
| peroxide (A) | 0.3 | 0.3 | 0.3 | 0.3 | 0.3 | 0.3 | 0.3 | 0.3 | 0.3 |
| Composition of thermoplastic elastomer B | | | | | | | | | |
| thermoplastic elastomer A | 90 | 85 | 80 | 65 | 50 | 80 | 80 | 92 | 80 |
| olefin resin | 10*[1] | 15*[1] | 20*[1] | 35*[1] | 50*[1] | 20*[2] | 20*[3] | 8*[1] | 20*[1] |
| Basic Properties | | | | | | | | | |
| M100 (Kgf/cm²) | 45 | 46 | 50 | 75 | 105 | 48 | 48 | 30 | 32 |
| $T_B$ (Kgf/cm²) | 110 | 112 | 115 | 155 | 210 | 110 | 115 | 85 | 85 |
| $E_B$ (%) | 580 | 580 | 580 | 600 | 620 | 580 | 580 | 630 | 630 |
| HS JIS-A (Shore-D) | 83 | 83 | 83 | (40) | (48) | 83 | 83 | 68 | 68 |
| PS (%) | 21 | 20 | 21 | 28 | 40 | 20 | 20 | 10 | 10 |
| SP (°C.) | 138 | 139 | 141 | 147 | 149 | 132 | 135 | 122 | 125 |
| Gel content (wt %) | 95 | 96 | 98 | 96 | 98 | 98 | 98 | 91 | 93 |
| M Value | 0.5 | 0.5 | 0.5 | 0.5 | 0.5 | 0.5 | 0.5 | 0.5 | 0.5 |
| Bonding Strength (kg/cm) to nylon | broken | broken | broken | broken | broken | broken | broken | broken | broken |
| Bonding Strength (kg/cm) to Fe | broken | broken | broken | broken | broken | broken | broken | broken | broken |
| Bonding Strength (kg/cm) to EVAL | broken | broken | broken | broken | broken | broken | broken | broken | broken |

Note
*[1] PP,
*[2] LLDPE,
*[3] HDPE

We claim:

1. A thermoplastic elastomer composition (B) of a partially cross-linked blend comprising:
   (a) 10 to 95 parts by weight of an ethylene/-propylene/non-conjugated diene rubber in which the molar ratio between ethylene units and propylene units is from 50/50 to 90/10;
   (b) 5 to 90 parts by weight of an isotactic or syndiotactic monoolefin homopolymer or copolymer or crystalline polyethylene, the sum of the amounts of the components (a) and (b) being 100 parts by weight, and (c) 0.1 to 5 parts by weight of an a,B-unsaturated carboxylic acid or an anhydride thereof or ester thereof, said thermoplastic elastomer composition (B) being graft modified and partially cross-linked by dynamically heat-treating said blend in the presence of an organic peroxide which is incorporated in an amount of 0.1 to 1% by weight based on the total amounts of the components (a), (b) and (c).

2. A thermoplastic elastomer composition as set forth in claim 1, wherein said blend further comprises at least one additive selected from the group consisting of (d) 0 to 100 parts by weight of a peroxide-noncurable hydrocarbon rubber, (e) 0 to 200 parts by weight of a mineral oil softener and (f) 0 to 100 parts by weight of a fibrous filler, per 100 parts by weight of the sum of the amounts of the components (a) and (b).

3. A thermoplastic elastomer composition as set forth in claim 2, wherein a fibrous filler (f) is incorporated in the thermoplastic elastomer before partial crosslinking or during grafting or after the partial crosslinking.

4. A thermoplastic elastomer composition (B) as set forth in any of claims 1 through 3, wherein a polyolefin plastic (A) is further incorporated into the partially cross-linked thermoplastic elastomer composition and is present in a non-cross-linked state in the thermoplastic elastomer composition.

5. A thermoplastic elastomer composition as set forth in claim 1, wherein a polyolefin plastic (A) is incorporated into the thermoplastic elastomer composition (B) at an (A)/(B) weight ratio of from 0/100 to 75/25.

6. A thermoplastic elastomer composition as set forth in claim 1 which further comprises a polyolefin plastic (A) post-added to said dynamically heat-treated partially cross-linked thermoplastic elastomer composition.

7. A thermoplastic elastomer composition as set forth in claim 6 wherein the polyolefin plastic (A) is incorporated into the thermoplastic elastomer composition (B) at an (A)/(B) weight ratio of from 5/95 to 75/25.

8. A thermoplastic elastomer composition as set forth in claim 1 wherein the ethylene/propylene/non-conjugated diene rubber comprises an ethylene/propylene/5-ethylidene-2-norbornene copolymer rubber or an ethylene/propylene/5-ethylidene-2-norbornene/dicyclopentadiene quadripolymer.

9. A thermoplastic elastomer composition as set forth in claim 1 wherein the component (b) is selected from the group consisting of polyethylene, isotactic polypropylene, propylene/ethylene copolymer, propylene/1-hexene copolymer and propylene/4-methyl-1-pentene copolymer.

10. A thermoplastic elastomer composition as set forth in claim 1 wherein component (c) is selected from the group consisting of maleic acid, bicyclo (2,2,1) hept-2-ene-5,6-dicarboxylic acid and the anhydrides thereof.

11. A thermoplastic elastomer composition as set forth in claim 2 wherein the component (d) is present and is selected from the group consisting of polyisobutylene, butyl rubber, propylene/ethylene copolymer rubber having a propylene content of at least 70 mole percent and atactic polypropylene.

12. A thermoplastic elastomer composition as set forth in claim 2 wherein component (e) is present.

13. A thermoplastic elastomer composition as set forth in claim 2 wherein component (f) is present, said fibrous filler having a diameter of 0.1 to 15 microns and a length of from 5 to 10 microns.

14. A thermoplastic elastomer composition as set forth in claim 16 wherein said fibrous filler is selected from the group consisting of milled glass fiber, glass flake, potassium titanate fiber and mixtures thereof.

15. A thermoplastic elastomer composition as set forth in claim 1 wherein said blend further comprises at least one additive selected from the group consisting of (d) 5 to 100 parts by weight of a a rubbery polymer which is not cross-linkable by peroxide, (e) 3 to 100 parts by weight of a mineral oil type softener and (f) 0.1 to 100 parts by weight of a fibrous filler, per 100 parts by weight of the sum of the amounts of the components (a) and (b).

16. A thermoplastic elastomer composition as set forth in claim 1 wherein said blend further comprises at least one additive selected from the group consisting of (d) 5 to 50 parts by weight of a peroxide-noncurable hydrocarbon rubber, (e) 3 to 80 parts by weight of a mineral oil type softener and (f) 4 to 35 parts by weight of a fibrous filler, per 100 parts by weight of the sum of the amounts of the components (a) and (b).

17. A thermoplastic elastomer composition as set forth in claim 1 wherein said blend is partially cross-linked in the presence of said organic peroxide and a peroxy-cross-linking assistant selected from the group consisting of p-quinone dioxime, p,p'-dibenzoylquinone dioxime, N-methyl-N,N-dinitrosoaniline, nitrobenzene, diphenylguanidine, trimethylolpropane-N,N'-m-phenylene maleimide, N-methyl-N,N'-m-phenylene dimaleimide, divinylbenzene, triallyl isocyanurate, polyfunctional methacrylate monomers, and polyfunctional vinyl monomers.

18. A thermoplastic elastomer composition as set forth in claim 1 wherein said blend is partially cross-linked by dynamically heat-treating the blend in the presence of said organic peroxide and divinylbenzene.

19. A thermoplastic elastomer composition as set forth in claim 18 wherein the amount of the divinylbenzene is from 0.1 to 2% by weight, based on the total amount of the components to be treated.

20. The thermoplastic elastomer composition according to claim 1, wherein the unsaturated carboxylic acid or an anhydride thereof or ester thereof is present in an amount of from about 1 part to 5 parts by weight.

21. The thermoplastic elastomer composition according to claim 1, wherein the organic peroxide is incorporated in an amount of from about 0.3% to 1% by weight base on the total amount of the components (a), (b) and (c).

22. The thermoplastic elastomer composition according to claim 10, wherein the unsaturated carboxylic anhydride is maleic anhydride.

* * * * *

UNITED STATES PATENT AND TRADEMARK OFFICE
CERTIFICATE OF CORRECTION

PATENT NO. : 5,310,800

DATED : May 10, 1994

INVENTOR(S) : Shizuo SHIMIZU et al

It is certified that error appears in the above-identified patent and that said Letters Patent is hereby corrected as shown below:

Column 29, line 4, change "a,B-unsaturated" to read --$\alpha,\beta$-unsaturated--.

Signed and Sealed this

Twentieth Day of September, 1994

Attest:

BRUCE LEHMAN

Attesting Officer

Commissioner of Patents and Trademarks